(12) United States Patent
Lim

(10) Patent No.: US 12,346,936 B2
(45) Date of Patent: Jul. 1, 2025

(54) TERMINAL AND OPERATING METHOD THEREOF

(71) Applicant: KAKAO CORP., Jeju-si (KR)

(72) Inventor: Hee Jin Lim, Seongnam-si (KR)

(73) Assignee: KAKAO CORP., Jeju-Si (KR)

( * ) Notice: Subject to any disclaimer, the term of this patent is extended or adjusted under 35 U.S.C. 154(b) by 0 days.

(21) Appl. No.: 17/895,060

(22) Filed: Aug. 25, 2022

(65) Prior Publication Data
US 2023/0063328 A1    Mar. 2, 2023

(30) Foreign Application Priority Data

Aug. 26, 2021    (KR) ................ 10-2021-0113231

(51) Int. Cl.
| | |
|---|---|
| *G06Q 30/00* | (2023.01) |
| *G06F 3/023* | (2006.01) |
| *G06Q 30/0241* | (2023.01) |
| *G06Q 30/0251* | (2023.01) |
| *H04L 51/10* | (2022.01) |

(52) U.S. Cl.
CPC ....... *G06Q 30/0271* (2013.01); *G06F 3/0237* (2013.01); *G06Q 30/0277* (2013.01); *H04L 51/10* (2013.01)

(58) Field of Classification Search
None
See application file for complete search history.

(56) References Cited

U.S. PATENT DOCUMENTS

| | | | |
|---|---|---|---|
| 2015/0127453 A1 | 5/2015 | Tew et al. | |
| 2017/0052650 A1* | 2/2017 | Koolwal | G06F 16/487 |
| 2019/0035000 A1* | 1/2019 | Soltanipour | H04L 51/52 |

FOREIGN PATENT DOCUMENTS

| | | | |
|---|---|---|---|
| CN | 102938727 A | * | 2/2013 |
| KR | 10-2011-0054182 A | | 5/2011 |
| KR | 10-1767399 B1 | | 8/2017 |
| KR | 10-2018-0093626 A | | 8/2018 |

(Continued)

OTHER PUBLICATIONS

Steam, How to put hyperlink in emoticon?—https://steamcommunity.com/discussions/forum/1/1698294337766409370/ (Year: 2018).*
(Continued)

*Primary Examiner* — Michael W Schmucker
(74) *Attorney, Agent, or Firm* — Banner & Witcoff, Ltd.

(57) ABSTRACT

Disclosed are a terminal on which a messenger application for an instant messaging service is installed and an operating method thereof. The terminal is configured to, based on whether a word input by a user to a chat window of the instant messaging service is an event keyword for an advertisement event, display an interfacing object associated with the event keyword, when the user selects the interfacing object, expose at least one piece of advertisement content of a recommended emoticon set and an event banner, in which the recommended emoticon set includes event emoticons associated with the event keyword and the event banner induces an entry to an advertisement event page associated with the event keyword, and based on whether the user participates in the advertisement event, receive a reward corresponding to the advertisement content.

21 Claims, 9 Drawing Sheets

(56) References Cited

FOREIGN PATENT DOCUMENTS

KR       10-1911180 B1    10/2018
WO    WO-2014025095 A1 *  2/2014   ......... H04N 21/2665

OTHER PUBLICATIONS

Korean Office Action for KR Application No. 10-2021-0113231 mailed on Oct. 13, 2022.
"Monthly mobile mail order", pp. 1-3.
Japanese Office Action—JP App. No. 2022-134067 mailed Sep. 19, 2023.

* cited by examiner

TERMINAL AND OPERATING METHOD THEREOF

CROSS-REFERENCE TO RELATED APPLICATION(S)

This application claims the priority benefit of Korean Patent Application No. 10-2021-0113231 filed on Aug. 26, 2021, in the Korean Intellectual Property Office, the disclosure of which is incorporated herein by reference for all purposes.

BACKGROUND

1. Field

One or more example embodiments relate to a terminal on which a messenger application for an instant messaging service is installed and an operating method thereof.

2. Description of Related Art

Various emoticons may be provided such that users may reflect their individuality and have fun while sending a message through an instant messaging service. The users may purchase an individual emoticon or an emoticon set on an instant messenger application on a smartphone or may purchase emoticons by accessing a separate website selling emoticons. In addition, the users may use emoticons provided through various advertisement events for free for a certain period.

SUMMARY

According to an aspect, there is provided an operating method of a terminal on which a messenger application for an instant messaging service is installed including: displaying an interfacing object associated with an event keyword, based on whether a word input by a user to a chat window of the instant messaging service is the event keyword for an advertisement event; when the user selects the interfacing object, exposing at least one piece of advertisement content of a recommended emoticon set and an event banner, in which the recommended emoticon set includes event emoticons associated with the event keyword and the event banner induces an entry to an advertisement event page associated with the event keyword; and receiving a reward corresponding to the advertisement content, based on whether the user participates in the advertisement event.

When the word is the event keyword, the displaying the interfacing object may include displaying a hint emoticon associated with the event keyword on an input area to which the word is input.

The displaying the hint emoticon may include displaying the hint emoticon included in a recommended emoticon set of an advertiser selected from among advertisers who have bidden for an advertisement associated with the event keyword.

The displaying the interfacing object may include determining the word is the event keyword, based on whether the word matches the event keyword included in a keyword dictionary for the advertisement event.

The keyword dictionary may be updated when an event keyword database included in a server providing the instant messaging service is updated interoperably with an event keyword registered in a customer's server.

The interfacing object may include a hint emoticon associated with the event keyword.

The exposing the advertisement content may include displaying the advertisement content in different forms, based on whether the user is a subscriber to a service provided by the server providing the instant messaging service.

The displaying the advertisement content in different forms may include, when the user is a subscriber to the service provided by the server, displaying a recommended emoticon set including the interfacing object, and emoticons recommended, based on the event keyword, by the server, and when the user is not a subscriber to the service provided by the server, displaying the recommended emoticon set including the interfacing object.

The exposing the advertisement content may include, when the user selects the event banner, exposing the advertisement event page through a modal view associated with the event banner.

The receiving the reward may include receiving the reward, based on whether the user participates in the advertisement event through the advertisement event page.

The receiving the reward may include, based on whether the user participates in the advertisement event, obtaining a use authority controlled by types of event emoticons included in the recommended emoticon set.

The types of event emoticons may include a first type for providing a use authority to the user regardless of whether the user participates in the advertisement event and a second type for blocking a use authority of the user, based on whether the user participates in the advertisement event.

The receiving the reward may include, when the user participates in the advertisement event, receiving the second type of event emoticons with the use authority unblocked.

According to another aspect, there is provided an operating method of a terminal on which a messenger application for an instant messaging service is installed including: receiving an input of selecting, by a user, an event emoticon displayed in an area where a chat message is displayed in a chat window of the instant messaging service; based on whether a word mapped based on the selected event emoticon is an event keyword for an advertisement event, exposing at least one piece of advertisement content of a recommended emoticon set and an event banner, in which the recommended emoticon set includes event emoticons associated with the event keyword and the event banner induces an entry to an advertisement event page associated with the event keyword; and receiving a reward corresponding to the advertisement content, based on whether the user participates in the advertisement event.

According to another aspect, there is provided an operating method of a server for an instant messaging service including: transmitting, to a terminal, a keyword dictionary including event keywords preset for an advertisement event: based on whether a word mapped based on a hint emoticon or an event emoticon selected by a user from the terminal is one of the event keywords included in the keyword dictionary, determining whether the user participates in the advertisement event through at least one piece of advertisement content provided to the terminal; and when determining that the user participates in the advertisement event, providing a reward corresponding to the advertisement content.

The at least one piece of advertisement content may include at least one of a recommended emoticon set and an event banner, in which the recommended emoticon set includes event emoticons associated with the event keyword and the event banner induces an entry to an advertisement event page associated with the event keyword.

The hint emoticon may be provided when a subscriber to a service provided by the server inputs a word corresponding to the event keyword.

The keyword dictionary may be updated when an event keyword database included in the server is updated interoperably with an event keyword registered in a customer's server.

According to another aspect, there is provided a terminal on which a messenger application for an instant messaging service is installed including: a processor configured to, based on whether a word input by a user to a chat window of the instant messaging service is an event keyword for an advertisement event, display an interfacing object associated with the event keyword, when the user selects the interfacing object, expose at least one piece of advertisement content of a recommended emoticon set and an event banner, in which the recommended emoticon set includes event emoticons associated with the event keyword and the event banner induces an entry to an advertisement event page associated with the event keyword, and based on whether the user participates in the advertisement event, receive a reward corresponding to the advertisement content; and a display configured to display the interfacing object associated with the event keyword in the chat window.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Figure 1:
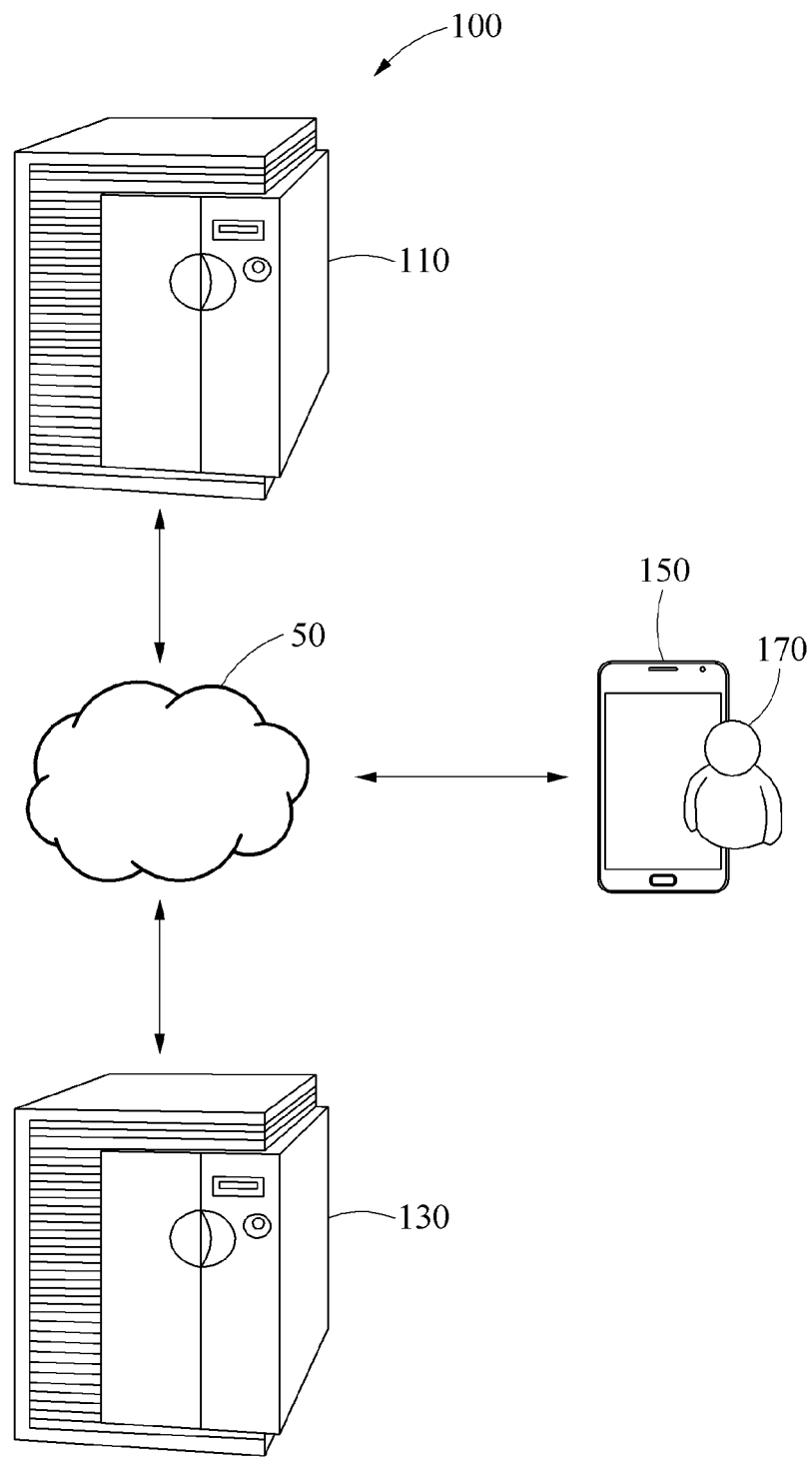
FIG. 1 is a diagram illustrating a configuration of a system for performing an operating method of a terminal according to an example embodiment.

The following detailed structural or functional description is provided as an example only and various alterations and modifications may be made to the examples. Here, examples are not construed as limited to the disclosure and should be understood to include all changes, equivalents, and replacements within the idea and the technical scope of the disclosure.

Terms, such as first, second, and the like, may be used herein to describe various components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/including" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, examples will be described in detail with reference to the accompanying drawings. When describing the example embodiments with reference to the accompanying drawings, like reference numerals refer to like components and a repeated description related thereto will be omitted.

FIG. 1 is a diagram illustrating a configuration of a system for performing an operating method of a terminal according to an example embodiment. Referring to FIG. 1, a system 100 may include a server 110, a customer's server 130, and a terminal 150 of a user 170.

The server 110, the customer's server 130, and the terminal 150 may connect to one another through a communication network 50. There may be a single terminal 150 or a plurality of terminals 150.

The server 110 may interoperate, in terms of a user interface (UI), a function, an operation, or a service, with an instant messenger application installed on the terminal 150. The server 110 may be a server providing an instant messaging service or a social networking service and may generate a chatroom for an account of the user 170 who uses the instant messaging service. The server 110 may be, for example, an Instant Message Service (IMS) server, but examples are not limited thereto. The server 110 may generate a chatroom providing, for example, a one-to-one chat service between the user 170 and another user and/or a group chat service between the user 170 and other users.

The server 110 may connect to the customer's server 130 through, for example, an application programming interface (API). The server 110 may receive, from the customer's server 130 through the API, a request for an advertisement, a bid for an advertisement, an application for registering an advertisement event keyword and/or promotion information, and the like.

The server 110 may include at least one processor for performing a process for the instant messaging service and may include a memory for storing data for the instant messaging service.

The server 110 may be, for example, a single server computer or a system similar thereto or one or more server banks or a plurality of servers arranged in other arrangements. The server 110 may be in a single facility or may be a server "cloud" distributed among many different geographical positions. The server 110 may be, for example, a server 403 illustrated in FIG. 4.

The customer's server 130 may be a server of a customer (e.g., a company or a business operator) intending to provide the user 170 with various forms of advertisements or pieces of advertisement content associated with goods, products, services, and/or content which are produced, manufactured, or sold by the customer. The consumer's server 130 may be a server of an advertiser selected from among advertisers bidding for an event keyword preset in association with an advertisement target (e.g., the goods, products, services, and/or content) or bidding for an advertisement associated with the event keyword. The customer's server 130 may provide, through the server 110, the user 170 of the terminal 150, on which a messenger application is installed, with various advertisement events, pieces of advertisement content, and the like, associated with the advertisement target.

The customer's server 130 may request the server 110 to register an event keyword corresponding to an event target and/or promotion information. The promotion information may include information for an advertisement, public relations, sales promotion, personal sales, direct marketing (DM), and the like, but examples are not limited thereto.

The event keyword that the customer's server 130 has requested the server 110 to register may be stored, for example, in an event keyword database of the server 110. In addition, the promotion information that the customer's server 130 has requested the server 110 to register may be stored, for example, in an event management database of the server 110.

In addition, the customer's server 130 may include a customer's user management database that stores and updates information on participants in an advertisement event. For example, when the server 110 issues an event coupon to a user A, the server 110 may notify the customer's server 130 of issuing the event coupon to the user A. In this case, the customer's server 130 may store and/or update, in and/or to the customer's user management database, the user A and the issuing of the event coupon to the user A.

The event keyword database and/or the event management database of the server 110 may be updated interoperably when the customer's server 130 updates the event keyword and/or the promotion information.

The messenger application installed on the terminal 150 may drive the terminal 150. The messenger application may include an application of a social networking service (SNS) having an instant messenger function. The user 170 may use the instant messaging service provided by the server 110 through the instant messenger application installed on the terminal 150. For example, the user 170 may generate a user account by subscribing to the instant messaging service through the instant messenger application installed on the terminal 150 and may use the instant messaging service through the generated user account.

The terminal 150 may include a display, a memory, a processor, and a communication interface and may be, for example, a smartphone or a wearable device, which is provided with an instant messaging service and/or a social networking service. The terminal 150 may process a UI or user interaction through the processor (e.g., a processor 710 of FIG. 6) or provide a processing result to the server 110.

The terminal 150 may be an electronic device, for example, one of a computer, a portable computer, a wireless phone, a mobile phone, a smartphone, a laptop computer, a personal digital assistant (PDA), a wearable device, a web tablet, and the like, and may include any devices for installing and executing an instant messenger application associated with the server 110.

The instant messaging service may provide a function of transmitting and receiving data between the terminal 150 and a terminal of another user through a chatroom in which a user account may participate in the terminal 150. One or more user accounts subscribing to the instant messaging service may participate in the chatroom, and a participant in the chatroom may transmit and receive, to and from other participant(s), messages including various visual information, such as text, emojis, emoticons, a figure, and the like, and auditory information, such as voice.

The terminal 150 may provide the user 170 with various advertisement events and/or pieces of advertisement content through an application for the instant messaging service, and based on whether the user 170 participates in an advertisement event, may provide various tangible or intangible rewards corresponding to advertisement content. A reward may be, for example, an event coupon in an app coupon form, such as a discount coupon issued in association with an advertisement target corresponding to the advertisement event or a use authority of event emoticons associated with an event keyword, but examples are not limited thereto. In this case, the event emoticons may be, for example, event emoticons included in a recommended emoticon set. The recommended emoticon set may be provided by, for example, the server 110, the customer's server 130, or a separate entity different from the server 110 and the customer's server 130. In addition, when the reward is a use authority of event emoticons, the use authority of the user 170 for the event emoticons may be stored in, for example, a user's authority management database of the server 110.

The application for the instant messaging service may receive, from the server 110, a keyword dictionary including advertisement keywords preset for the advertisement event and may store the keyword dictionary in the terminal 150. The keyword dictionary may be updated when the event keyword database included in the server 110 providing the instant messaging service is updated interoperably with the event keywords registered in the customer's server 130.

The terminal 150 may determine whether a word input by the user 170 to a chat window of the terminal 150 is an event keyword for the advertisement event. When the input word corresponds to the event keyword for the advertisement event, the terminal 150 may display an interfacing object associated with the event keyword in the chat window. In this case, the "interfacing object" may be, for example, a visual object, such as an icon, a button, an emoji, and the like, that may interface with the user 170. The interfacing object associated with the event keyword may include a hint emoticon associated with the event keyword, but examples are not limited thereto.

The "hint emoticon" may be an emoticon representing or directly referring to the word input by the user 170 or providing a hint associated with the word input by the user 170. The hint emoticon, for example, may correspond to the word input by the user 170, may have the form of a representative image associated with the word input by the user 170, or may be an emoticon in the form of a representative image including representative onomatopoeia and/or a mimetic word corresponding to the word input by the user 170, but examples are not limited thereto. For example, when the word input by the user 170 is "fried chicken", the hint emoticon may be an emoticon including a representative image in various forms (e.g., a chicken, a chicken drumstick, fried chicken, etc.) associated with the event keyword "fried chicken" and representative onomatopoeia (e.g., "yum-yum", a crunchy sound, "cock-a-doodle-doo", etc.) corresponding to the "fried chicken".

Although the user 170 is not supposed to have a use authority of the hint emoticon, the use authority of the hint emoticon may be temporarily provided to the user 170 only when the user 170 inputs the word corresponding to the event keyword in an input window with the advertisement event corresponding to the event keyword initiated. The hint emoticon may be provided, for example, when a subscriber to a service by the server 110 providing the instant messaging service inputs the word corresponding to the event keyword. The hint emoticon may function as a fun factor when the user 170 uses the event emoticon and may induce the user 170 to subscribe to the service and/or to participate in the advertisement event.

The terminal 150 may provide advertisement content inducing the user 170 to participate in the advertisement event such that the user 170 may obtain the use authority of the event emoticon through participation in the advertisement event or may lead the user 170 to land on a separate selling page where the user 170 may purchase the event emoticon. In this case, the "advertisement content inducing the user 170 to participate in the advertisement event" may include a recommended emoticon set including event emoticons associated with an event keyword and an event banner inducing an entry to an advertisement event page, but examples are not limited thereto.

In some example embodiments, the terminal 150 may display advertisement content (e.g., an event banner) in a keyboard area, which is provided when the user 170 selects an event emoticon that is transmitted by another user and displayed in a chat window. When the user 170 selects the event banner displayed in the keyboard area, the terminal 150 may expose an advertisement event page through a modal view associated with the event banner.

In this case, the "event emoticon" may be an emoticon associated with products or services of a customer provided through the customer's server 130. The event emoticon may be an emoticon, including a symbol, a pattern, or a picture that represents a product and/or a service, for advertising the product and/or the service targeted by the customer's server 130.

The event emoticon may be an emoticon associated with a target of the advertisement event. For example, when the target of the advertisement event is a "Gimbap (chain store)", to advertise a sales product of the customer, that is, Gimbap, the event emoticon may include an emoticon associated with the "Gimbap (chain store)", such as an image implying Gimbap, an image personifying Gimbap, a character taken from the image of Gimbap, a character eating or holding Gimbap, and the like.

The types of event emoticon(s) may be classified into, for example, a first type and a second type, in which the first type provides a use authority to the user 170 regardless of whether the user 170 participates in the advertisement event and the second type blocks the use authority of the user 170, based on whether the user 170 participates in the advertisement event.

Although the first type of event emoticons may provide the use authority to the user 170 regardless of whether the user 170 participates in the advertisement event, a use period may or may not be limited. When the use period is limited, the user 170 may use the first type of event emoticons for a limited time through, for example, an event. When the first type of event emoticons are usable for a limited time, the first type of event emoticons may also be referred to as "time-limited emoticons". The first type of event emoticons usable for a limited time may be dimmed when a certain use period ends and may be deactivated or deleted. In this case, "dimming" may be construed as graying out a deactivated icon.

A second type of event emoticon may be an emoticon granting a use authority (e.g., a transmission authority) when the user 170 participates in the advertisement event. When the use authority of the second type of event emoticon is not granted, a sign (e.g., a key-shaped lock sign) indicating that the use authority of the second type of event emoticons is blocked may be displayed. When the use authority of the second type of event emoticons is granted, the lock sign displayed on the second type of event emoticons may disappear and indicate that the user 170 has the transmission authority for the second type of event emoticons.

Figure 2:
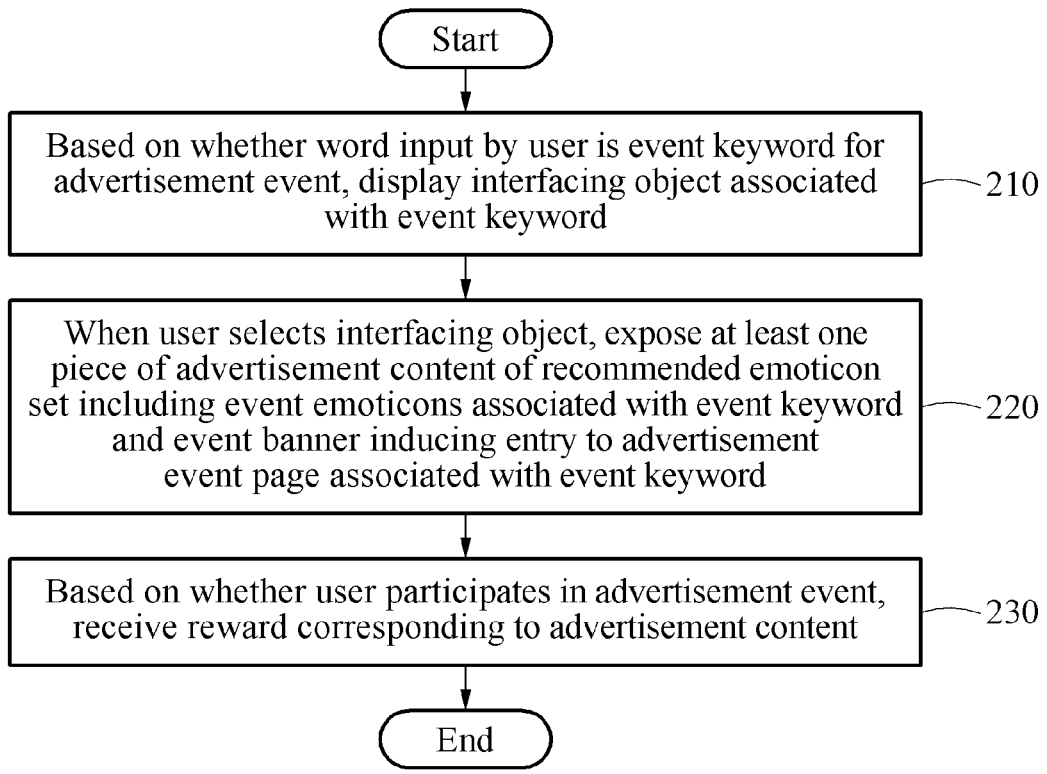
FIG. 2 is a flowchart illustrating an operating method of the terminal, according to an example embodiment.

FIG. 2 is a flowchart illustrating an operating method of the terminal, according to an example embodiment. In the following embodiments, operations may be performed sequentially, but are not necessarily limited thereto. For example, the order of the operations may change and at least two of the operations may be performed in parallel.

Referring to FIG. 2, exposing advertisement content associated with an event keyword and receiving a reward through operations 210 to 230 by a terminal are illustrated.

In operation 210, the terminal (e.g., the terminal 150 of FIG. 1) may display an interfacing object associated with the event keyword in a chat window of an instant messaging service, based on whether a word input by a user (e.g., the user 170 of FIG. 1) is the event keyword for an advertisement event. The interfacing object may include a hint emoticon associated with the event keyword.

The terminal may determine whether the word input by the user is the event keyword for an advertisement event, and when the word input by the user is the event keyword, may display the interfacing object associated with the event keyword. The terminal may determine whether the word input by the user matches an event keyword included in a keyword dictionary for the advertisement event. The keyword dictionary may be updated when an event keyword database included in a server (e.g., the server 110 of FIG. 1) providing the instant messaging service is updated interoperably with event keywords registered in a customer's server (e.g., the customer's server 130 of FIG. 1). When the word input by the user does not match the event keyword, the terminal may display the word input to the chat window by the user as text without displaying a separate interfacing object.

On the other hand, when the word input by the user matches the event keyword, the terminal may determine that the word input by the user is the event keyword.

When the word input by the user is determined to be the event keyword, the terminal may display, in an input area (e.g., a second area 311 of FIG. 3A) to which the event keyword is input, a hint emoticon (e.g., a hint emoticon 313 of FIG. 3A) associated with the event keyword. When the word input by the user is determined to be the event keyword, the terminal may display the hint emoticon. The terminal may display a hint emoticon included in a recommended emoticon set of an advertiser selected from among advertisers having bidden for an advertisement associated with the event keyword. The hint emoticon displayed in the input area may be one of event emoticons included in the recommended emoticon set or another event emoticon.

For example, in an area (e.g., a first area 315 of FIG. 3A) displaying a chat message in the chat window, an event emoticon (e.g., an event emoticon 317 of FIG. 3A, in which a character holding a chicken drumstick advertises fried chicken) transmitted by another user may be displayed. In this case, when the user selects the event emoticon transmitted by the other user, the terminal may determine whether a keyword mapped to the selected event emoticon is the event keyword and may expose advertisement content such that the user may receive a reward. An example of exposing advertisement content when a user selects an event emoticon transmitted by another user is described in detail with reference to FIG. 5.

In operation 220, when the user selects the interfacing object displayed in operation 210, the terminal may expose at least one piece of advertisement content of a recommended emoticon set and an event banner, in which the recommended emoticon set includes event emoticons associated with the event keyword and the event banner induces an entry to an advertisement event page associated with the event keyword.

The terminal may display the advertisement content in different forms, based on whether the user is a subscriber to a service provided by the server providing the instant messaging service. In this case, the service may be, for example, "Emoticon Plus", which is a service providing a subscription to purchasable emoticons, but examples are not limited thereto. For example, the terminal may verify whether the user is a subscriber to the service through a user account registered in the server, and according to a verification result, may display the advertisement content in different forms.

For example, when the user is a subscriber to the service, the terminal may display a recommended emoticon set including the interfacing object, and based on the word input by the user (that is, the event keyword), may display emoticons recommended by the server. According to some example embodiments, the terminal may display a preview of the emoticons recommended, based on the event keyword, by the server.

On the other hand, when the user is not a subscriber to the service, the terminal may display the recommended emoticon set including the interfacing object.

In addition, when the user selects the event banner (e.g., an event banner 337 displayed on a screen 330 of FIG. 3A), the terminal may expose the advertisement event page (e.g., an advertisement event page 355 of FIG. 3B) including an event coupon (e.g., an event coupon 357 displayed on a screen 350 of FIG. 3B) through a modal view associated with the event banner. The "modal view" may be one of view management techniques for switching among multiple views provided by the operating system (OS) of the terminal. The modal view may be used to pause an ongoing operation (e.g., displaying the event banner) performed by the terminal, display the advertisement event page to the user, and return to the paused operation. In this case, the advertisement event page may include an event coupon or a reward other than the event coupon.

The terminal may expose the advertisement event page through, for example, the modal view called by an in-app browser associated with the event banner in the chat window. The in-app browser may be also referred to as an internal browser and may be a browser depending on an application, that is, a browser called by the application.

Figure 3A:
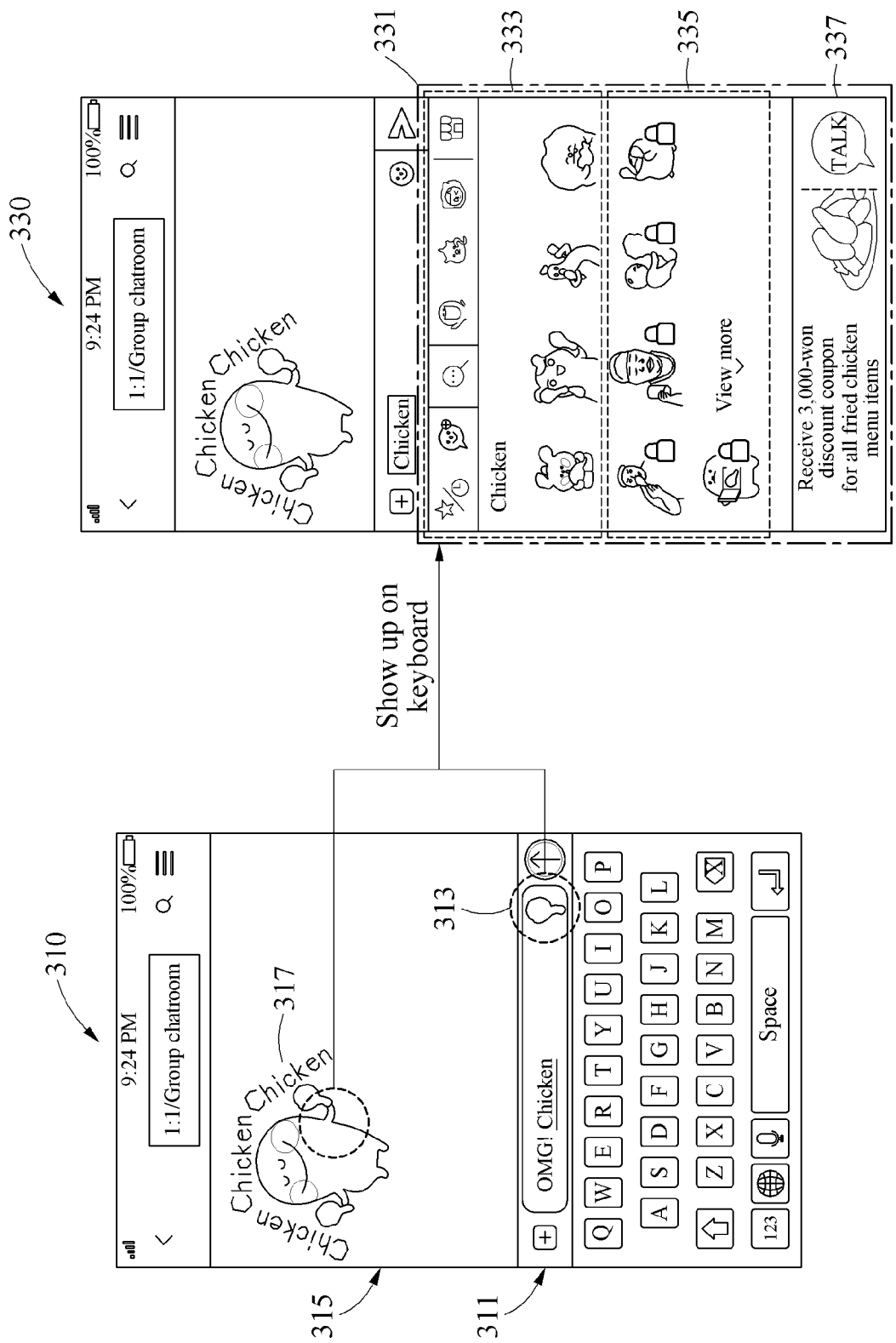
FIGS. 3A, 3B, and 3C are a diagram illustrating receiving a reward corresponding to advertisement content according to an example embodiment.

In some example embodiments, the terminal may display the event banner 337 in a keyboard area 331, which is provided when the user selects the event emoticon 317 that is transmitted by the other user and displayed in the chat window on a screen 310 of FIG. 3A. When the user selects the event banner 337, the terminal may expose the advertisement event page 355 including the event coupon 357 on the screen 350 of FIG. 3B through the modal view associated with the event banner 337.

In operation 230, the terminal may receive a reward corresponding to the advertisement content exposed in operation 220, based on whether the user participates in the advertisement event. Based on whether the user participates in the advertisement event, the terminal may obtain a use authority controlled by types of event emoticons included in a recommended emoticon set. The types of event emoticons may include at least one of a first type and a second type, in which the first type provides a use authority to the user regardless of whether the user participates in the advertisement event and the second type blocks the use authority of the user, based on whether the user participates in the advertisement event.

For example, when the user does not participate in the advertisement event, the terminal may provide the first type of event emoticons providing the use authority, such as event emoticons displayed in a first area 333 in the keyboard area 331 on the screen 330 of FIG. 3A. In another example, although the user does not participate in the advertisement event, the terminal may grant the user the transmission authority for some event emoticons (e.g., the first type of event emoticons) and may induce the user experiencing emoticon transmission to participate in the advertisement event. In this case, the first type of event emoticons may or may not have a limit on a use period.

Figure 3B:
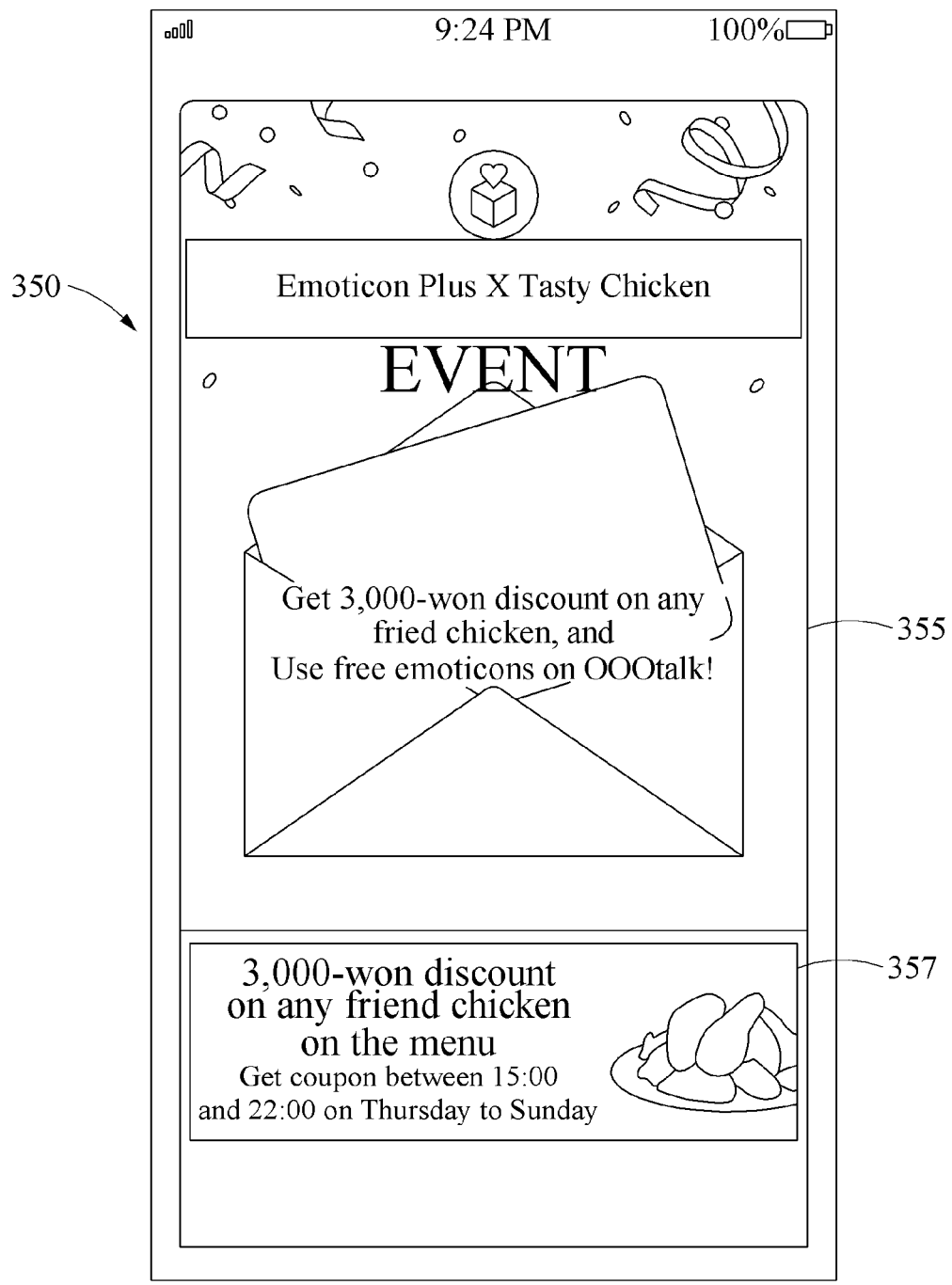
Figure 3C:
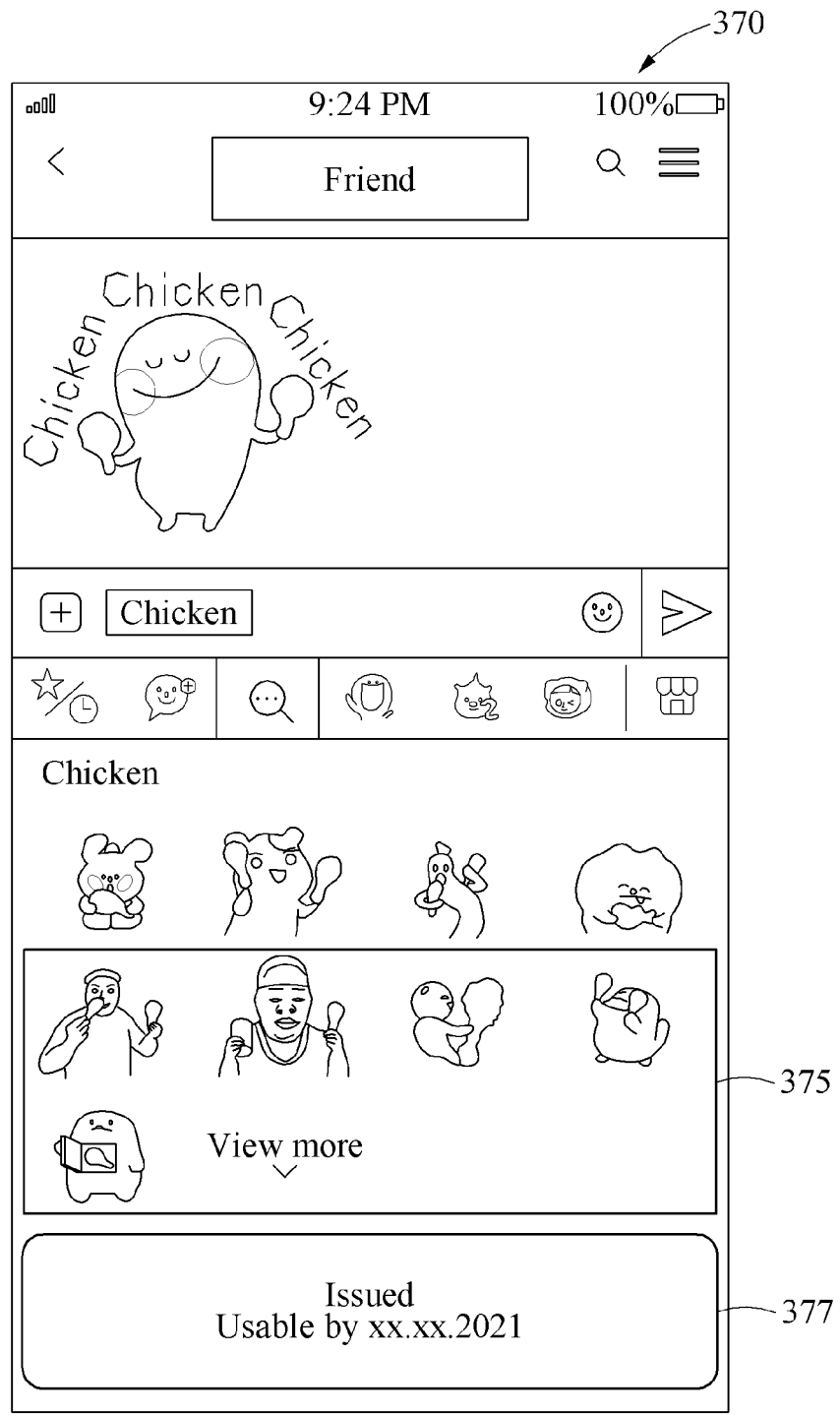

For example, when the user participates in the advertisement event through the advertisement event page, the terminal may obtain the second type of event emoticons with a use authority unblocked, such as, referring to FIG. 3C, emoticons displayed in a second area 375 on a screen 370. In this case, the use authority may be verified to be unlocked when the key-shaped lock sign on a second type of event emoticons displayed in a second area 335 in the keyboard area 331 on the screen 330 of FIG. 3A disappears from a second type of event emoticons displayed in the second area 375 on the screen 370 of FIG. 3C.

Alternatively, the terminal may receive a reward from a server, based on whether the user participates in the advertisement event through the advertisement event page. The reward may include an event coupon, but examples are not limited thereto. For example, when the user selects the event banner 337 displayed on the screen 330 of FIG. 3A and participates in the advertisement event, the terminal may receive the event coupon 357 from the server and provide the event coupon 357 to the user. When the event coupon has been provided, a screen of the terminal may expose a UI (e.g., a message 377 displayed on the screen 370 of FIG. 3C) indicating that the event coupon has been issued.

FIGS. 3A, 3B, and 3C are a diagram illustrating receiving a reward corresponding to advertisement content according to an example embodiment.

Referring to FIG. 3A, a screen 310 and a screen 330 are illustrated, in which the screen 310 is displayed when a user inputs an event keyword preregistered for an advertisement event and the screen 330 is displayed when the user selects an interfacing object 313 displayed on the screen 310.

The user may input, to a chat window of an instant messaging service illustrated on the screen 310, the phrase ("OMG! Chicken") including a word corresponding to the event keyword ("chicken") preregistered for the advertisement event. The terminal may determine whether a word input to the chat window or the word included in the phrase input to the chat window matches the preregistered event keyword. In this case, an event corresponding to one customer may be mapped to one event keyword.

When the word input by the user matches the event keyword, the terminal may display, on the screen 310, at least one interfacing object 313 associated with the event keyword. For example, when the phrase ("I like either coffee or chicken") input to the chat window by the user includes both a word ("chicken") that matches the event keyword and a word ("coffee") that does not match the event keyword, the word "chicken" that matches the event keyword may be displayed in a form distinct from the form of the word "coffee" that does not match the event keyword. The terminal may display the event keyword "chicken" in various forms, such as bold, underlined, highlighted, or flickering letters, and may indicate to the user that the word is the event keyword.

On the screen 310, for example, a drumstick-shape hint emoticon, that is, the interfacing object 313, may be displayed in the input area 311 to which the user inputs a word.

For example, when the user selects the hint emoticon, that is, the interfacing object 313, displayed on the screen 310, a keyboard result tab 331 including at least one of an event emoticon and an event banner may be displayed on a keyboard as on the screen 330. In this case, the keyboard result tab 331 may be a result screen of the keyboard exposed in a user terminal and may be an emoticon keyboard area where emoticons and (clickable) additional banners other than the emoticons are provided. The keyboard result tab 331 may be, for example, an area where an event banner and an event emoticon are exposed in operation 440 of FIG. 4.

The emoticons displayed in the keyboard result tab 331 may be, for example, other event emoticons mapped to the event keyword or a recommended emoticon set mapped to the event keyword.

The keyboard result tab 331 may include at least one of a first area 333, a second area 335, and an event banner 337, in which the first area 333 includes a first type of event emoticons, the second area 335 includes a second type of event emoticons, and the event banner 337 induces an entry to an advertisement event page (e.g., the advertisement event page 355 of FIG. 3B) associated with the event keyword. In this case, the first type and second type of event emoticons displayed in the first area 333 and/or the second area 335 may be emoticons associated with the event keyword.

The "emoticon(s) associated with the event keyword" may be construed as emoticon(s) explicitly or implicitly indicating the event keyword and/or expressed in various forms associated with or implying the event keyword. For example, the emoticons associated with the event keyword may include a representative image (e.g., a chicken image) corresponding to the event keyword, an image (e.g., a drumstick image) associated with the event keyword, an event keyword itself (e.g., "chicken chicken"), a phrase (e.g., "Let's enjoy fried chicken!" or "Fried chicken is my favorite.") including the event keyword, onomatopoeia (e.g., a clucking sound, a crunch sound, or a chomping sound) associated with the event keyword, and a mimetic word (e.g., a word describing devouring or gobbling up fried chicken) associated with the event keyword, but examples are not limited thereto.

The first type of event emoticons may be emoticons providing a use authority to the user regardless of whether the user participates in the advertisement event. Accordingly, the user may select and use the first type of event emoticons displayed in the first area 333 without participating in the advertisement event. The use period of the first type of event emoticons may be set by a customer or the server. For example, the use period may be a week or a month from an initial access date of the user, but examples are not limited thereto. When the use period ends, the first type of event emoticons may be dimmed or deleted. The use authority of the first type of event emoticons may include a transmission authority that allows the user to transmit the first type of event emoticons to another user.

The second type of event emoticons displayed in the second area 335 may be emoticons for which a use authority of the user may be blocked, based on whether the user participates in the advertisement event. A key-shaped lock sign on the second type of event emoticons displayed in the second area 335 may indicate that the use authority of the user may be blocked. When the user participates in the advertisement event, the user may obtain the use authority of the second type of event emoticons displayed in the second area 335. Accordingly, the key-shaped lock sign on the second type of event emoticons in the second area 335 may disappear, and as with event emoticons displayed in the second area 375 of FIG. 3, may indicate that the user may use the second type of event emoticons.

Although the event banner 337 is exposed at the bottom of the keyboard result tab 331 on the screen 330, examples are not limited thereto, and the event banner 337 may be freely exposed at the top of the keyboard result tab 331 or an area where a chat message is displayed outside the keyboard result tab 331. The event banner 337 may induce an entry to the advertisement event page associated with the event keyword. For example, when the user selects the event banner 337, the advertisement event page, as illustrated in FIG. 3B, may be displayed in the terminal.

In addition, when the user selects an event emoticon 317 displayed on the screen 310, the keyboard result tab 331 including at least one of an event emoticon and an event banner may be displayed on a keyboard as on the screen 330. In this case, the event emoticon 317 may be an event emoticon transmitted by another user.

In some example embodiments, when the user selects any one of the hint emoticon 313 displayed on the screen 310 and the event emoticon 317 transmitted by the other user, advertisement content provided to the user may be displayed in different forms, based on whether the user is a subscriber to a service.

In this case, the "service" may be, for example, an "Emoticon Plus" service providing a subscription to purchasable emoticons. For example, when the user is a subscriber to the service, the terminal may display a recommended emoticon set including an interfacing object and may display a preview of emoticons recommended, based on the event keyword, by the server. Alternatively, when the user is not a subscriber to the service, the terminal may display the recommended emoticon set including the interfacing object.

Referring to FIG. 3B, a screen 350 is illustrated, on which the advertisement event page 355 including an event coupon 357 is exposed through a modal view associated with an event banner When the user selects the event banner 337 illustrated in FIG. 3A, the terminal may display a modal view on a keyboard as on the screen 350 and may expose the advertisement event page 355.

For example, the advertisement event page 355 may be an advertisement page directly provided to a server in a uniform resource locator (URL) form by a customer's server of an advertiser having bidden for an advertisement associated with an event keyword or an advertisement page generated by the server.

When the advertisement event page 355 is provided by the customer's server, the server may verify, through user information that has been input to the customer's server, whether the user participates in an advertisement event. On the other hand, when the advertisement event advertisement event page 355 and verify the information on the user who has participated in the advertisement event and may thereafter transmit the information on the user to the customer's server.

In some example embodiments, the number of exposures of an advertisement page of a customer on the advertisement event page 355 by the terminal may correspond to a bid price of customers having bidden for the event keyword.

The user may receive a reward by participating in the advertisement event through the advertisement event page 355. For example, the user may participate in the advertisement event by selecting the event coupon 357 included in the advertisement event page 355 and may receive the reward. When the user closes the modal view after participating in the advertisement event by clicking the event coupon 357 displayed on the screen 350, the terminal may return to an original chat window screen as illustrated in FIG. 3C.

Referring to FIG. 3C, a screen 370 is illustrated, in which the terminal returns to an original chat window after the user participates in the advertisement event.

For example, when the user has participated in the advertisement event by clicking the event coupon 357 included in the advertisement event page 355 illustrated in FIG. 3B, a state of the second type of event emoticons on the screen 330 illustrated in FIG. 3A may be switched to a usable state as a reward of the participation in the advertisement event. When the state of a second type of event emoticons is switched to a usable state, the key-shaped lock sign may disappear from event emoticons displayed in a second area 375 of the screen 370 of FIG. 3C.

When the user has participated in the advertisement event, the terminal may expose a UI 377 indicating that the reward (e.g., the event coupon 357) of the participation in the advertisement event through the advertisement event page 355 is provided as on the screen 370. For example, the UI 377 may include information on an expiration date (e.g., "usable by xx.xx.2021") of the event coupon 357 with a phrase (e.g., "issued") notifying that the event coupon 357 has been issued. For example, the UI 377 may be overlaid on the position of the event coupon 357, but examples are not limited thereto.

The reward (e.g., the event coupon 357) issued to the user after the user has participated in the advertisement event may be transmitted to a gift box or a coupon box of the user in a form desired by the customer or may be transmitted as an instant message.

In an example embodiment, when a user directly inputs a keyword corresponding to an event keyword to a chat window or the user clicks an event emoticon transmitted by another user, the terminal may provide the user with the list of transmittable event emoticons and an event participation button.

In an example embodiment, a viral effect among users may increase by allowing the users to transmit some event emoticons (e.g., the first type of event emoticons) regardless of whether the users participate in the advertisement event, and the users may easily participate in the advertisement event by providing easy access to an advertisement event page in a keyboard.

Figure 4:
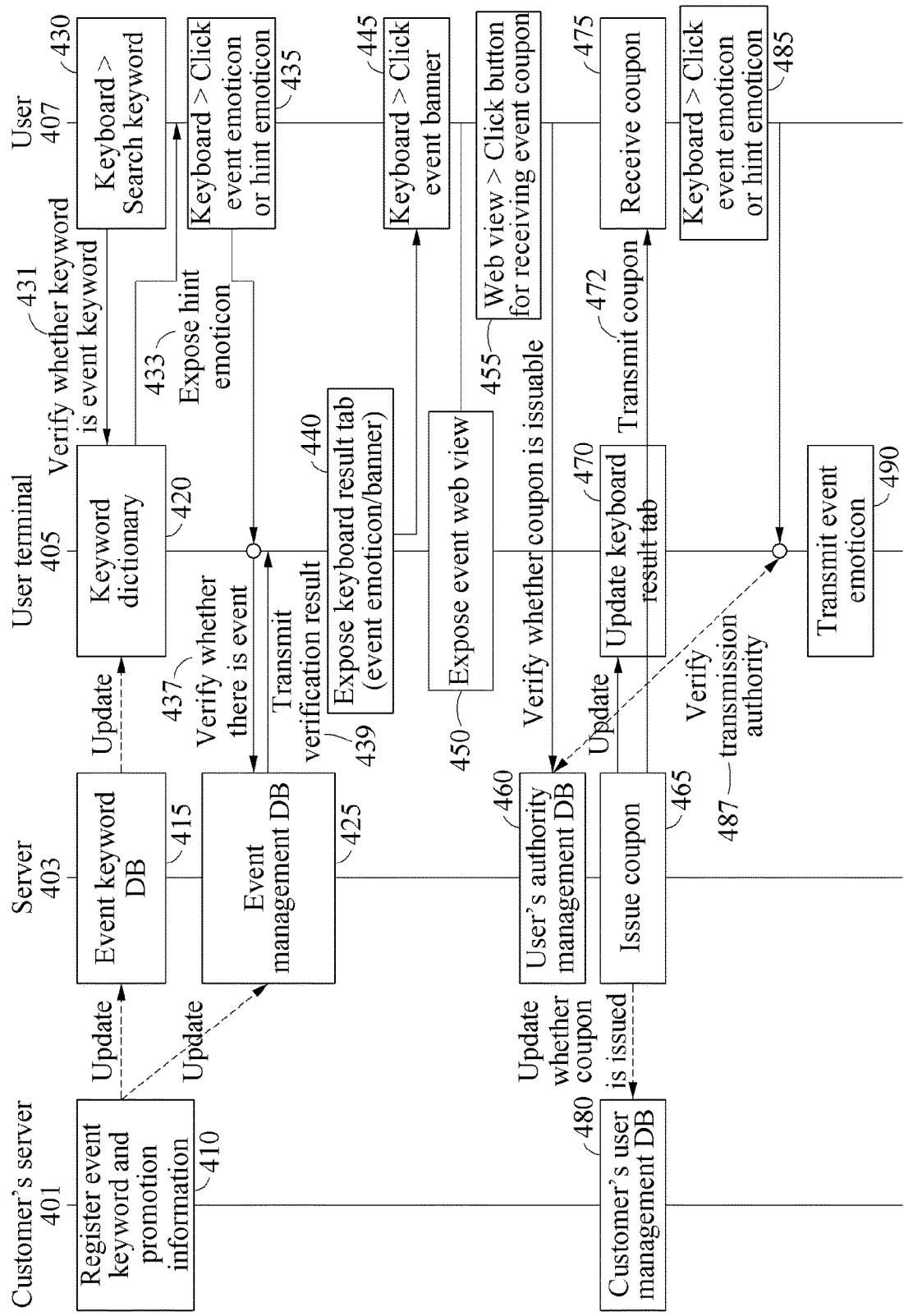
FIG. 4 is a diagram illustrating an operation between components of a system according to an example embodiment.

FIG. 4 is a diagram illustrating an operation between components of a system according to an example embodiment. In the following embodiments, operations may be performed sequentially, but are not necessarily limited thereto. For example, the order of the operations may change and at least two of the operations may be performed in parallel.

Referring to FIG. 4, providing a reward corresponding to advertisement content through operations 410 to 490 by a system is illustrated, in which the system includes a customer's server 401, a server 403, a user terminal 405, and a user 407.

In operation 410, the customer's server 401 may register an event keyword and promotion information for an advertisement through an instant messaging service provided by the server 403. When the event keyword is registered in the customer's server 401, in operation 415, the server 403 may update an event keyword database storing event keywords. When the event keyword database of the server 403 is updated in operation 415, the user terminal 405 may update a keyword dictionary in operation 420 interoperably with the event keyword database updated.

In addition, when the promotion information is registered in the customer's server 401 in operation 410, the server 403 may update an event management database storing pieces of promotion information in operation 425.

When the user 407 of the user terminal 405 searches with a keyword through a keyboard displayed in a chat window in operation 430, the user terminal 405 may verify whether the keyword is the event keyword, based on whether the keyword matches the keyword dictionary in operation 431.

When the keyword is verified to be the event keyword in operation 431, the user terminal 405 may expose a hint emoticon associated with the keyword in operation 433.

In operation 435, the user 407 may click and select the hint emoticon exposed in operation 433 or an event emoticon transmitted by another user. In this case, in operation 437, the user terminal 405 may verify, through the server 403, whether there is an event corresponding to the event emoticon and/or the hint emoticon. In operation 439, the server 403 may search the event management database and transmit, to the user terminal 405, a result of the verification in operation 437.

When the event corresponding to the event emoticon and/or the hint emoticon is verified through operation 439, the user terminal 405 may expose a keyboard result tab including at least one of an event emoticon and an event banner in operation 440.

In operation 445, when the user 407 clicks the event banner exposed in operation 440, the user terminal 405 may expose an event web view on a screen in operation 450. In this case, the event web view may be a modal view associated with the event banner. An advertisement event page may be exposed through the event web view. The advertisement event page may include various forms of rewards other than an event coupon. When the user 407 clicks a button for receiving an event coupon included in the exposed advertisement event page through the event web view in operation 455, the server 403 may verify, through a user's authority management database, whether a coupon is issuable to the user 407 in operation 460. In this case, the coupon may be the event coupon.

When the coupon is verified to be issuable to the user 407 in operation 460, the server 403 may issue the coupon to the user 407 in operation 465.

When the coupon is issued to the user 407, the server 403 may notify the user terminal 405 of the coupon issuance and may update the keyboard result tab (e.g., the keyboard result tab 331 of FIG. 3A) in operation 470.

In addition, in operation 472, the server 403 may transmit the coupon to the user 407 through the user terminal 405. When the coupon is transmitted from the server 403, the user 407 may receive the coupon in operation 475.

In addition, when the coupon is issued to the user 407, the server 403 may update whether the coupon is issued to the user 407 to a customer's user management database of the customer's server 401 in operation 480.

In operation 485, the user 407 may click the event emoticon or the hint emoticon after receiving the coupon. In operation 487, the user terminal 405 may request the server 403 to verify a transmission authority. In this case, the server 403 may verify, through the user's authority management database, whether the user has obtained the transmission authority for the event emoticon, for example, by participating in the event.

When the user 407 is verified to have the transmission authority for the event emoticon in operation 487, the user terminal 405 may transmit the event emoticon in operation 490.

Figure 5:
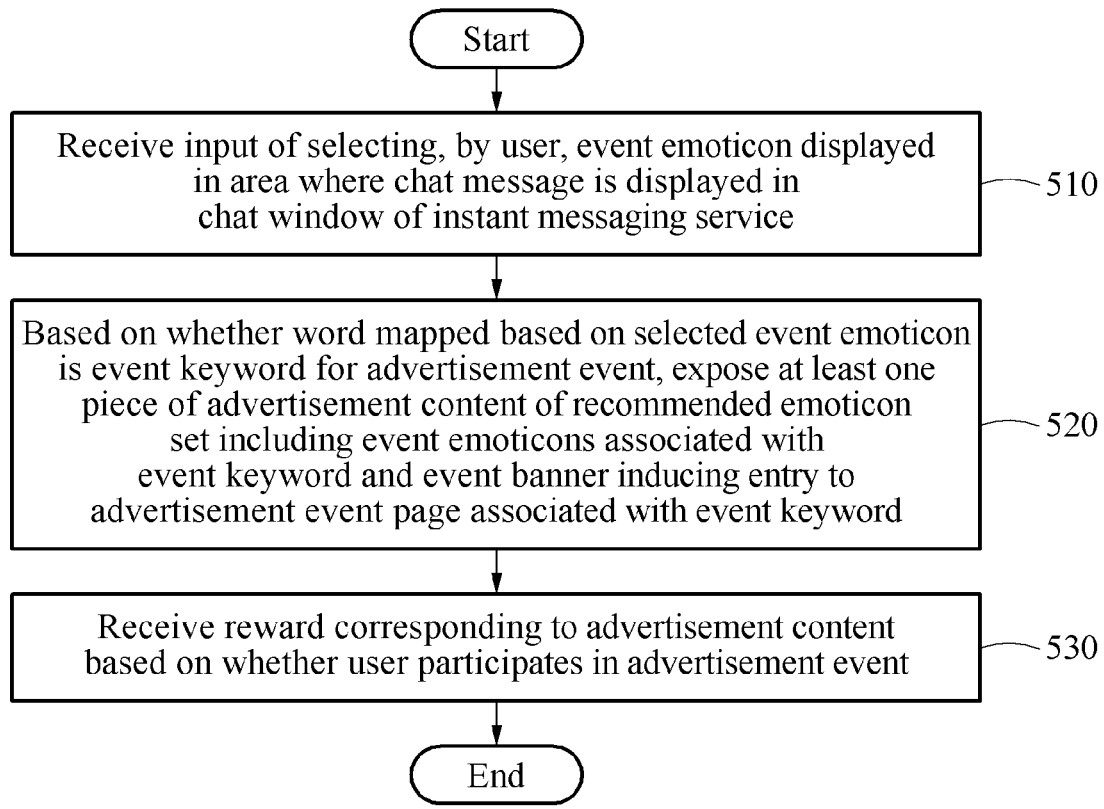
FIG. 5 is a flowchart illustrating an operating method of a terminal according to another example embodiment.

FIG. 5 is a flowchart illustrating an operating method of a terminal according to another example embodiment. In the following embodiments, operations may be performed sequentially, but are not necessarily limited thereto. For example, the order of the operations may change and at least two of the operations may be performed in parallel.

Referring to FIG. 5, exposing advertisement content associated with an event keyword and receiving a reward through operations 510 to 530 by a terminal are described. In this case, a messenger application for an instant messaging service may be installed on the terminal.

In operation 510, the terminal may receive an input of selecting, by a user, an event emoticon displayed in an area where a chat message is displayed in a chat window of the instant messaging service. In this case, the event emoticon displayed in the area where the chat message is displayed may be, for example, an event emoticon (e.g., the event emoticon 317 illustrated in FIG. 3A) transmitted by another user.

In operation 520, the terminal, based on whether a word mapped based on the event emoticon selected in operation 510 is an event keyword for an advertisement event, may expose at least one piece of advertisement content of a recommended emoticon set and an event banner, in which the recommended emoticon set includes event emoticons associated with the event keyword and the event banner induces an entry to an advertisement event page associated with the event keyword. In this case, a word corresponding to the event emoticon may be mapped to the event emoticon in advance. For example, when the word mapped based on the event emoticon selected in operation 510 matches an event keyword included in a keyword dictionary, the terminal may determine that the word mapped based on the event emoticon may be the event keyword. In this case, the keyword dictionary may be updated when an event keyword database included in a server (e.g., the server 110 of FIG. 1) providing the instant messaging service is updated interoperably with event keywords registered in a customer's server (e.g., the customer's server 130 of FIG. 1) as described above with reference to FIG. 2.

In operation 530, the terminal may receive a reward corresponding to the advertisement content, based on whether the user participates in the advertisement event.

A method of exposing at least one piece of advertisement content by the terminal in operation 520 of FIG. 5 may be the same as the method of exposing at least one piece of advertisement content described with reference to operation 220 of FIG. 2. A method of receiving a reward corresponding to the advertisement content in operation 530 may be the same as the method of receiving a reward described with reference to operation 230 of FIG. 2. Therefore, a detailed description thereon is not repeated.

Figure 6:
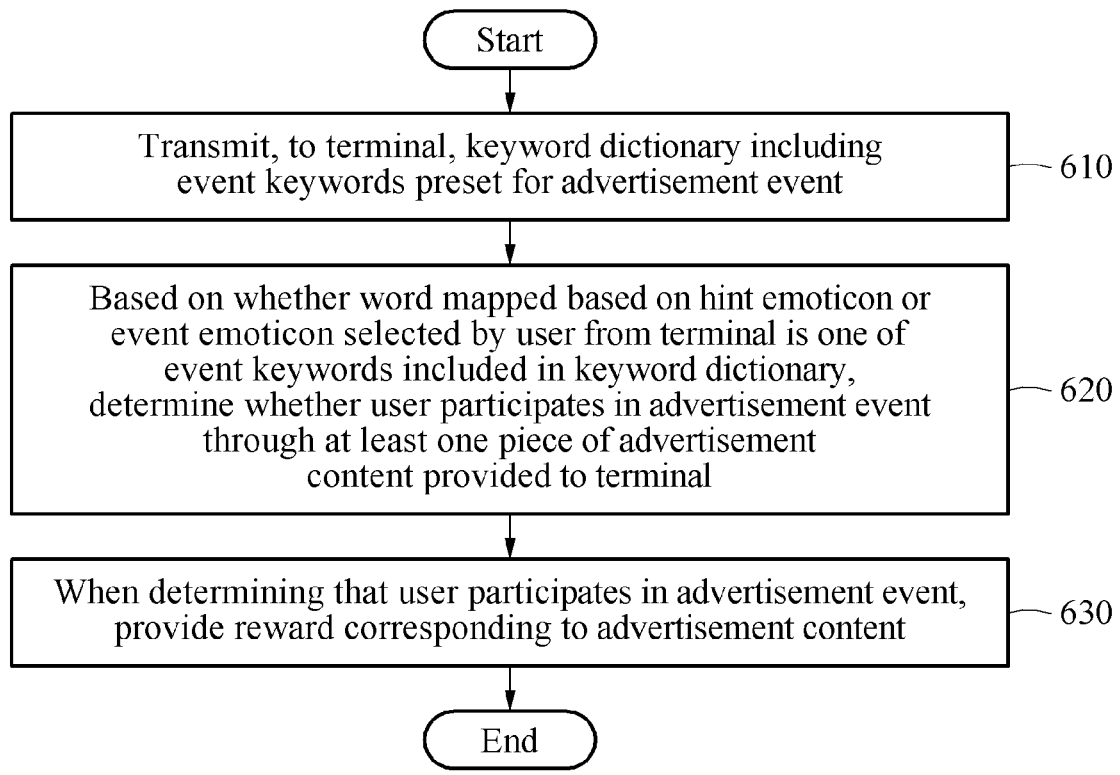
FIG. 6 is a flowchart illustrating an operating method of a server according to an example embodiment.

FIG. 6 is a flowchart illustrating an operating method of a server according to an example embodiment. In the following embodiments, operations may be performed sequentially, but are not necessarily limited thereto. For example, the order of the operations may change and at least two of the operations may be performed in parallel.

Referring to FIG. 6, providing a user with a reward by a server through operations 610 to 650 is described.

In operation 610, the server may transmit, to a terminal, a keyword dictionary including event keywords preset for an advertisement event. For example, the keyword dictionary may be updated when an event keyword database included in the server is updated interoperably with an event keyword registered in a customer's server.

In operation 620, based on whether a word mapped based on a hint emoticon or an event emoticon selected by the user from the terminal is one of the event keywords included in the keyword dictionary, the server may determine whether the user participates in the advertisement event through at least one piece of advertisement content provided to the terminal. For example, the hint emoticon may be provided when a subscriber to a service provided by the server inputs a word corresponding to the event keyword. At least one piece of advertisement content may include at least one of a recommended emoticon set and an event banner, in which the recommended emoticon set includes event emoticons associated with the event keyword and the event banner induces an entry to an advertisement event page associated with the event keyword.

In operation 630, when determining that the user participates in the advertisement event, the server may provide a reward corresponding to the advertisement content.

Figure 7:
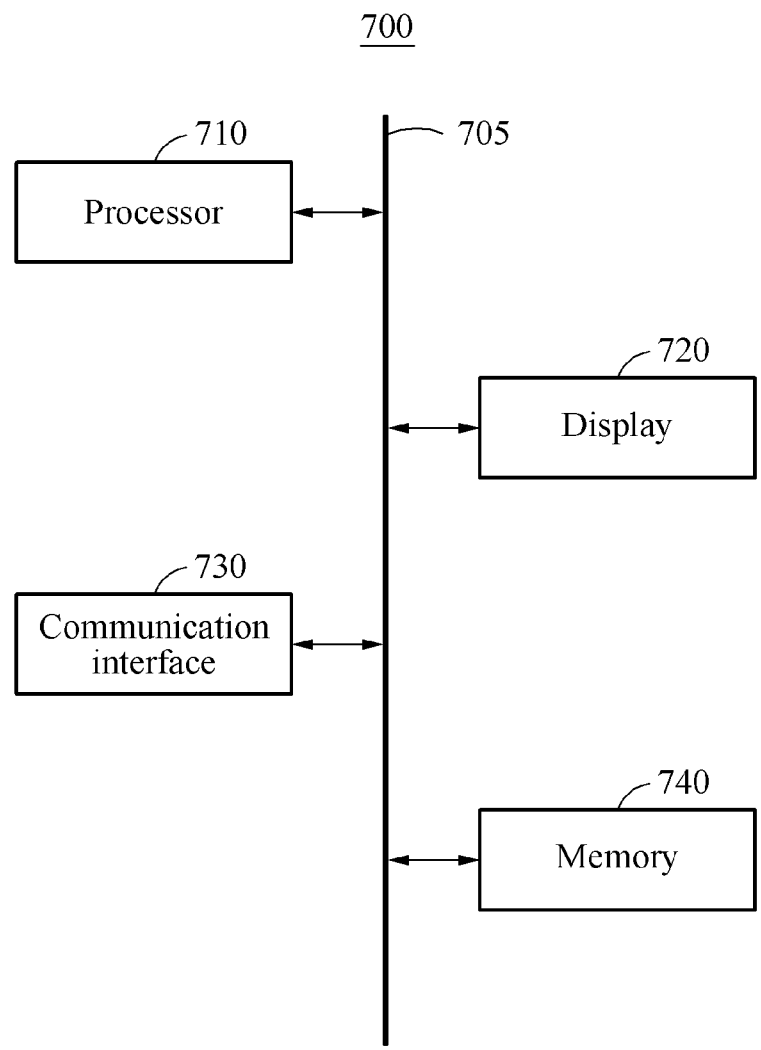
FIG. 7 is a block diagram illustrating a terminal according to another example embodiment.

FIG. 7 is a block diagram illustrating a terminal according to another example embodiment. Referring to FIG. 7, a terminal 700 may include a processor 710, a display 720, a communication interface 730, and a memory 740. The processor 710, the display 720, the communication interface 730, and the memory 740 may connect to one another through a communication bus 705.

The processor 710 may display an interfacing object associated with an event keyword, based on whether a word input by a user to a chat window of the instant messaging service is the event keyword for an advertisement event.

When the user selects the interfacing object, the processor 710 may expose at least one piece of advertisement content of a recommended emoticon set and an event banner, in which the recommended emoticon set includes event emoticons associated with the event keyword and the event banner induces an entry to an advertisement event page associated with the event keyword. For example, based on whether the user participates in the advertisement event through the advertisement event page, the processor 710 may provide a reward corresponding to the advertisement content.

When the word input by the user is the event keyword, the processor 710 may display, in an input area to which a word is input in the chat window, a hint emoticon associated with the event keyword.

Based on whether the word input by the user to the chat window of the instant messaging service and/or a word mapped based on an event emoticon selected by the user among event emoticons transmitted by another user that are displayed in the chat window match an event keyword included in a keyword dictionary for the advertisement event, the processor 710 may determine that the keyword is the event keyword. In this case, the keyword dictionary may be updated when an event keyword database included in a server providing the instant messaging service is updated interoperably with an event keyword registered in a customer's server.

For example, when the user is a subscriber to a service (e.g., Emoticon Plus) by the server providing the instant messaging service, the processor 710 may display emoticons recommended by the server, based on a recommended emoticon set including the interfacing object and the event keyword. Alternatively, for example, when the user is not a subscriber to the service, the processor 710 may display the recommended emoticon set including the interfacing object.

In addition, the processor 710 may perform at least one method described above with reference to FIGS. 1 to 5 or an algorithm corresponding to the at least one method. The processor 710 may execute a program and control the terminal 700. Code of the program executed by the processor 710 may be stored in the memory 740.

The display 720 may display the interfacing object associated with the keyword in the chat window.

The communication interface 730 may output the reward provided by the processor 710 to the outside of the terminal 700. The communication interface 730 may receive, from the server, the keyword dictionary for the advertisement event.

The memory 740 may store the keyword dictionary for advertisement event received from the server through the communication interface 730. The memory 740 may store various pieces of information generated during the operation of the processor 710. In addition, the memory 740 may store various pieces of data, programs, and the like. The memory 740 may include a high-capacity storage medium, such as a hard disk, and store the various pieces of data.

The examples described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, an FPGA, a programmable logic unit (PLU), a microprocessor or any other device capable of responding to and executing instructions in a defined manner. The processing device may run an OS and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape: optical media such as CD-ROM discs, DVDs, and/or Blue-ray discs: magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

As described above, although the examples have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An operating method of a terminal on which a messenger application for an instant messaging service is installed, the operating method comprising:

executing, by at least one processor of the terminal, the messenger application, wherein the executing the messenger application comprises causing output, on a display of the terminal, of a user interface screen, associated with a user of the terminal, that comprises a chat display window of the instant messaging service, wherein the chat display window is usable to send one or more messages to one or more second terminals;

receiving, by the at least one processor of the terminal and from a server, an event keyword package that indicates:
a set of event keywords; and a set of interfacing objects associated with the set of event keywords;
displaying, on the display of the terminal,
a user input interface screen configured to receive one or more user inputs, the user input interface screen comprising a user input display region;
receiving, via the user input interface screen, a plurality of characters input, by the user, via the user input interface screen,
displaying, in the displayed user input interface screen and based on a determination that the plurality of characters correspond to an event keyword of the set of event keywords, at least one interfacing object associated with the event keyword, wherein the at least one interfacing object comprises an image indicating the event keyword;
modifying, by the at least one processor of the terminal and based on one or more second user inputs indicating a selection of the at least one interfacing object, at least a portion of the user input interface screen by causing display,
in the modified at least a portion of the user input interface screen, of a recommended emoticon set and an event banner of an event corresponding to the event keyword, wherein the recommended emoticon set comprises a plurality of event emoticons that are locked and associated with the event keyword, and wherein the event banner is linked to an event page associated with the event keyword;
accessing, based on one or more third user inputs associated with the event banner, the event page by causing a browser application executing on the terminal to open the event page;
establishing, based on the accessing, a verification session for a verification of an authority management device associated with the server;
determining, using the verification session, whether a condition associated with the event is satisfied by monitoring user input associated with the event page;
authorizing, based on the condition associated with the event being satisfied and based on the verification of the authority management device, unlocking of at least one event emoticon of the plurality of event emoticons from a locked state of the at least one event emoticon; and
displaying, in a region of the modified at least the portion of the user input interface screen and based on the authorizing, an unlocked state of the at least one event emoticon;
receiving, via the user input interface screen, one or more fourth user inputs indicating a selection of the at least one event emoticon; and
transmitting, to the one or more second terminals, instructions that cause the one or more second terminals to display the at least one event emoticon.

2. The operating method of claim 1, wherein:
the displaying the at least one interfacing object comprises:
displaying, on an input area to which the plurality of characters are inputted, a hint emoticon associated with the event keyword.

3. The operating method of claim 1, further comprising:
updating, based on the event keyword package, a keyword dictionary of the terminal, wherein the keyword dictionary is updated, based on an event keyword database associated with the server being updated interoperably with an event keyword registered in a server of a service provider.

4. The operating method of claim 1, wherein the at least one interfacing object comprises:
a hint emoticon indicating the event keyword.

5. The operating method of claim 1, wherein the displaying the recommended emoticon set comprises:
before the condition associated with the event being satisfied:
displaying, in the region of the modified at least the portion of the user input interface screen, the plurality of event emoticons that are locked and a locked state of the plurality of event emoticons; and
displaying, in a second region of the modified at least the portion of the user input interface screen, a plurality of second event emoticons that are initially unlocked and associated with the event keyword, wherein the recommended emoticon set further comprises the plurality of second event emoticons.

6. The operating method of claim 1, further comprising:
selecting, based on a determination that the user is a subscriber of a particular service, at least one additional recommended emoticon, wherein the at least one additional recommended emoticon is recommended by the server based on the event keyword; and
displaying, in the modified at least the portion of the user input interface screen, the at least one additional recommended emoticon.

7. The operating method of claim 1, further comprising:
skipping, based on a determination that the user is not a subscriber of a particular service, a recommendation of at least one additional recommended emoticon.

8. A non-transitory computer-readable storage medium storing instructions that, when executed by at least one processor of a terminal, cause the terminal to:
execute a messenger application, wherein the executing the messenger application comprises causing output on a display of the terminal, of a user interface screen, associated with a user of the terminal, that comprises a chat display window of an instant messaging service, wherein the chat display window is usable to send one or more messages to one or more second terminals;
receive, from a server, an event keyword package that indicates:
a set of event keywords; and
a set of interfacing objects associated with the set of event keywords;
display, on the display of the terminal, the user interface screen,
a user input interface screen configured to receive one or more user inputs, the user input interface screen comprising a user input display region;
receive, via the user input interface screen, a plurality of characters input, by the user, via the user input interface screen;
display, in the displayed user input interface screen and based on a determination that the plurality of characters correspond to an event keyword of the set of event keywords, at least one interfacing object associated with the event keyword, wherein the at least one interfacing object comprises an image indicating the event keyword;
modify, based on one or more second user inputs indicating a selection of the at least one interfacing object, at least a portion of the user input interface screen by causing display, in the modified at least a portion of the user input interface screen, of a recommended emoticon set and an event banner of an event corresponding to the event keyword, wherein the recommended emoticon set comprises a plurality of event emoticons that are locked and associated with the event keyword, and wherein the event banner is linked to an event page associated with the event keyword;

access, based on one or more third user inputs associated with the event banner, the event page by causing a browser application executing on the terminal to open the event page;

establish, based on the accessing, a verification session for a verification of an authority management device associated with the server;

determine, using the verification session, whether a condition associated with the event is satisfied by monitoring user input associated with the event page;

authorize, based on the condition associated with the event being satisfied and based on the verification of the authority management device, unlocking of at least one event emoticon of the plurality of event emoticons from a locked state of the at least one event emoticon; and display, in a region of the modified at least the portion of the user input interface screen and based on authorizing of the unlocking, an unlocked state of the at least one event emoticon;

receive, via the user input interface screen, one or more fourth user inputs indicating a selection of the at least one event emoticon; and transmit, to the one or more second terminals, instructions that cause the one or more second terminals to display the at least one event emoticon.

9. The non-transitory computer-readable storage medium of claim 8, wherein the instructions, when executed by the at least one processor, cause the terminal to display the at least one interfacing object by:

displaying, on an input area to which the plurality of characters are inputted, a hint emoticon associated with the event keyword.

10. The non-transitory computer-readable storage medium of claim 8, wherein the instructions, when executed by the at least one processor, cause the terminal to:

update, based on the event keyword package, a keyword dictionary of the terminal, wherein the keyword dictionary is updated, based on an event keyword database associated with the server being updated interoperably with an event keyword registered in a server of a service provider.

11. The non-transitory computer-readable storage medium of claim 8, wherein the at least one interfacing object comprises a hint emoticon indicating the event keyword.

12. The non-transitory computer-readable storage medium of claim 8, wherein the instructions, when executed by the at least one processor, cause the terminal to display the recommended emoticon set by:

before the condition associated with the event being satisfied:

displaying, in the region of the modified at least the portion of the user input interface screen, the plurality of event emoticons that are locked and a locked state of the plurality of event emoticons; and displaying, in a second region of the modified at least the portion of the user input interface screen, a plurality of second event emoticons that are initially unlocked and associated with the event keyword, wherein the recommended emoticon set further comprises the plurality of second event emoticons.

13. The non-transitory computer-readable storage medium of claim 8, wherein the instructions, when executed by the at least one processor, further cause the terminal to:

select, based on a determination that the user is a subscriber of a particular service, at least one additional recommended emoticon, wherein the at least one additional recommended emoticon is recommended by the server based on the event keyword; and display, in the modified at least the portion of the user input interface screen, the at least one additional recommended emoticon.

14. The non-transitory computer-readable storage medium of claim 8, wherein the instructions, when executed by the at least one processor, further cause the terminal to:

skip, based on a determination that the user is not a subscriber of a particular service, a recommendation of at least one additional recommended emoticon.

15. A terminal on which a messenger application for an instant messaging service is installed, the terminal comprising:

a display configured to receive at least one user input;
a communication interface;
at least one processor; and
memory storing instructions that, when executed by the at least one processor, cause the terminal to:

execute the messenger application, wherein the executing the messenger application comprises causing output, on a display of the terminal, of a user interface screen, associated with a user of the terminal, that comprises a chat display window of the instant messaging service, wherein the chat display window is usable to send one or more messages to one or more second terminals;

receive, from a server, an event keyword package that indicates:
a set of event keywords; and
a set of interfacing objects associated with the set of event keywords;

display, on the display of the terminal,
a user input interface screen configured to receive one or more user inputs, the user input interface screen comprising a user input display region;

receive, via the user input interface screen, a plurality of characters input, by the user, via the user input interface screen;

display, in the displayed user input interface screen and based on a determination that the plurality of characters correspond to an event keyword of the set of event keywords, at least one interfacing object associated with the event keyword, wherein the at least one interfacing object comprises an image indicating the event keyword;

modify, based on one or more second user inputs indicating a selection of the at least one interfacing object, at least a portion of the user input interface screen by causing display, in the modified at least a portion of the user input interface screen, of a recommended emoticon set and an event banner of an event corresponding to the event keyword, wherein the recommended emoticon set comprises a plurality of event emoticons that are locked and associated with the event keyword, and wherein the event banner is linked to an event page associated with the event keyword;

access, based on one or more third user inputs associated with the event banner, the event page by causing a browser application executing on the terminal to open the event page;

establish, based on the accessing, a verification session for a verification of an authority management device associated with the server;

determine, using the verification session, whether a condition associated with the event is satisfied by monitoring user input associated with the event page;

authorize, based on the condition associated with the event being satisfied and based on the verification of the authority management device, unlocking of at least one event emoticon of the plurality of event emoticons from a locked state of the at least one event emoticon;

display, in a region of the modified at least the portion of the user input interface screen and based on authorizing of the unlocking, an unlocked state of the at least one event emoticon, receiving, via the user input interface screen, one or more fourth user inputs indicating a selection of the at least one event emoticon; and transmitting, to the one or more second terminals, instructions that cause the one or more second terminals to display the at least one event emoticon.

16. The terminal of claim 15, wherein the instructions, when executed by the at least one processor, cause the terminal to display the at least one interfacing object by:
displaying, on an input area to which the plurality of characters are inputted, a hint emoticon associated with the event keyword.

17. The terminal of claim 15, wherein the instructions, when executed by the at least one processor, cause the terminal to:
update, based on the event keyword package, a keyword dictionary of the terminal, wherein the keyword dictionary is updated, based on an event keyword database associated with the server being updated interoperably with an event keyword registered in a server of a service provider.

18. The terminal of claim 15, wherein the at least one interfacing object comprises a hint emoticon indicating the event keyword.

19. The terminal of claim 15, wherein the instructions, when executed by the at least one processor, cause the terminal to display the recommended emoticon set by:
before the condition associated with the event being satisfied:
displaying, in the region of the modified at least the portion of the user input interface screen, the plurality of event emoticons that are locked and a locked state of the plurality of event emoticons; and
displaying, in a second region of the modified at least the portion of the user input interface screen, a plurality of second event emoticons that are initially unlocked and associated with the event keyword, wherein the recommended emoticon set further comprises the plurality of second event emoticons.

20. The terminal of claim 15, wherein the instructions, when executed by the at least one processor, further cause the terminal to:
select, based on a determination that the user is a subscriber of a particular service, at least one additional recommended emoticon, wherein the at least one additional recommended emoticon is recommended by the server based on the event keyword; and
display, in the modified at least the portion of the user input interface screen, the at least one additional recommended emoticon.

21. The terminal of claim 15, wherein the instructions, when executed by the at least one processor, further cause the terminal to:
skip, based on a determination that the user is not a subscriber of a particular service, a recommendation of at least one additional recommended emoticon.

* * * * *